Oct. 1, 1963
G. G. RITTENHOUSE
3,105,703
COMBINED TRUCK AND TRAILER
Filed Feb. 6, 1962
3 Sheets-Sheet 1
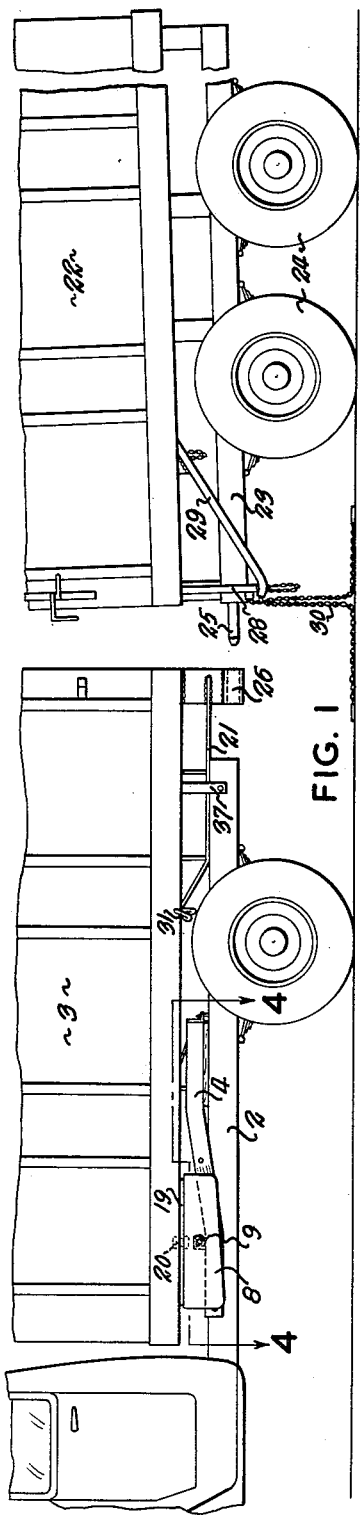
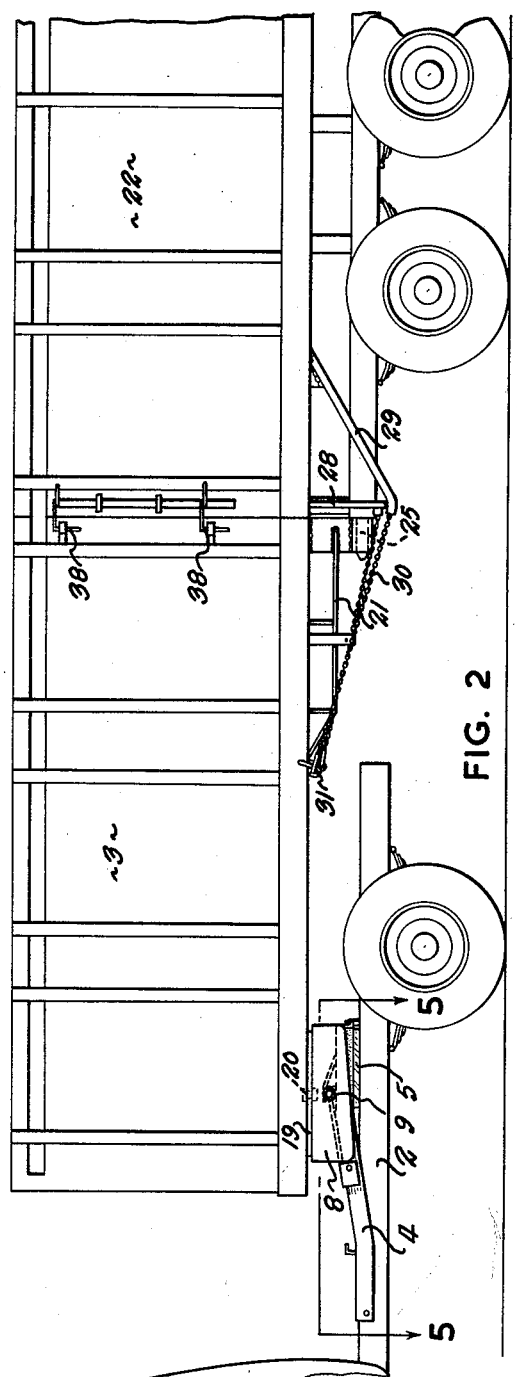
INVENTOR
GLEN G. RITTENHOUSE
BY Featherstonhaugh & Co
ATTORNEYS INVENTOR
GLEN G. RITTENHOUSE
BY: Fetherstonhaugh & Co
ATTORNEYS Oct. 1, 1963 G. G. RITTENHOUSE 3,105,703
COMBINED TRUCK AND TRAILER
Filed Feb. 6, 1962 3 Sheets-Sheet 3

INVENTOR
GLEN G. RITTENHOUSE

BY: Featherstonhaugh & Co
ATTORNEYS

United States Patent Office 3,105,703
Patented Oct. 1, 1963

3,105,703
COMBINED TRUCK AND TRAILER
Glen G. Rittenhouse, Jordan Station, Ontario, Canada
Filed Feb. 6, 1962, Ser. No. 171,424
9 Claims. (Cl. 280—415)

My invention relates to improvements in highway trucks and the object of the invention is to provide a combination comprising a truck and a truck body extension mounted upon road wheels and which may be readily attached to the rear end of the body of the truck as occasion demands.

The invention is not directed to the heavy type transport wherein a trailer truck is attached to a tractor, but rather to the provision of an extra load carrying extension attachable to the type of truck wherein the engine, cab and body are mounted upon the truck chassis, the invention enabling the owner to use the truck in the usual way for transporting loads within its capacity, but when bulkier loads are encountered the capacity of the truck may be readily increased by attachment of the extension to the rear end of the truck body.

As the extension is carried upon its own sets of road wheels which are necessarily spaced a considerable distance rearwardly of the rear wheels of the truck it is necessary that the wheels of the extension be permitted a lateral swinging highway movement relative to the rear wheels of the truck, and to attain this end one of the principal objects of my invention is to so mount the truck body upon the truck chassis that it may be moved rearwardly from its normal position upon the chassis to an extension attachment position wherein the front end of the body is swingably supported upon a fifth wheel mounted intermediately of the length of the chassis and the rear end of the body freed from the chassis and attached to the extension body by which it is supported; by which arrangement the truck engine, cab and chassis constitute a tractor and the combined truck body and extension a trailer supported at its front end by the fifth wheel and at its rear end by the wheels of the extension body.

A further object of the invention is to provide engaging male and female coupling members mounted upon the rear end of the truck body and the front end of the extension and to also provide a tie rod and tension chain arrangement beneath the coupling members to extend between the truck body and extension for the purpose of retaining them in locked arrangement and to also furnish a tensioned support against sagging at the junction of the body and extension.

With the foregoing and other objects in view as shall appear my invention consists of a highway truck and extension therefor constructed and arranged all as hereinafter more particularly described and illustrated in the accompanying drawing, in which:

FIG. 1 is a side view of the truck and extension body in separated relationship.

FIG. 2 is also a side view of the truck and extension body wherein the truck body has been moved rearwardly of the truck chassis and the extension body attached thereto.

Figure 3:
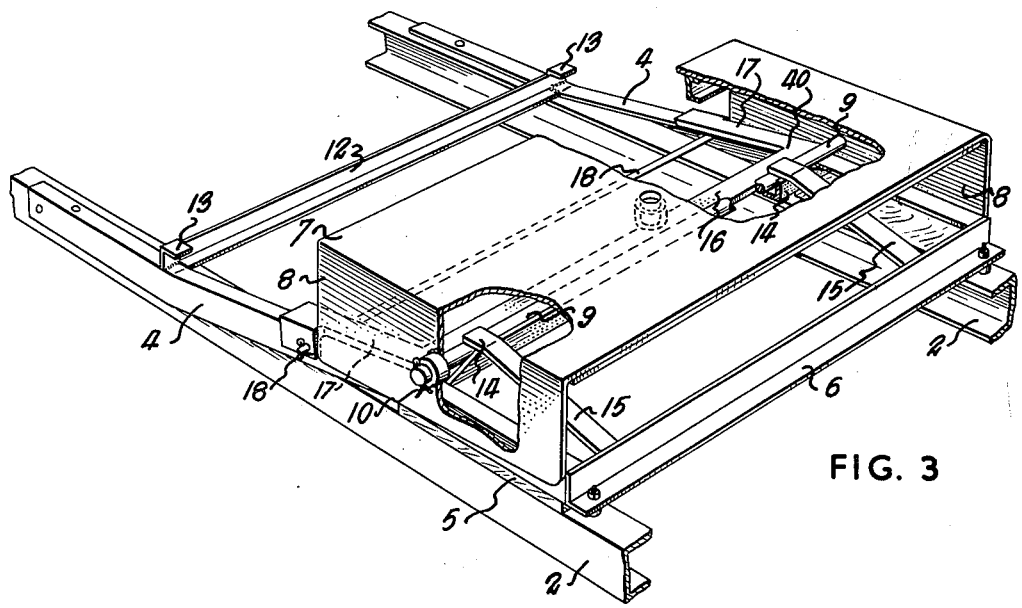
FIG. 3 is a perspective view of the portion of the truck chassis underlying the forward end of the truck body and showing a plate for supporting a fifth wheel carried upon the forward end of the truck body, together with a track upon which the plate is movably mounted.
Figures 4, 5:
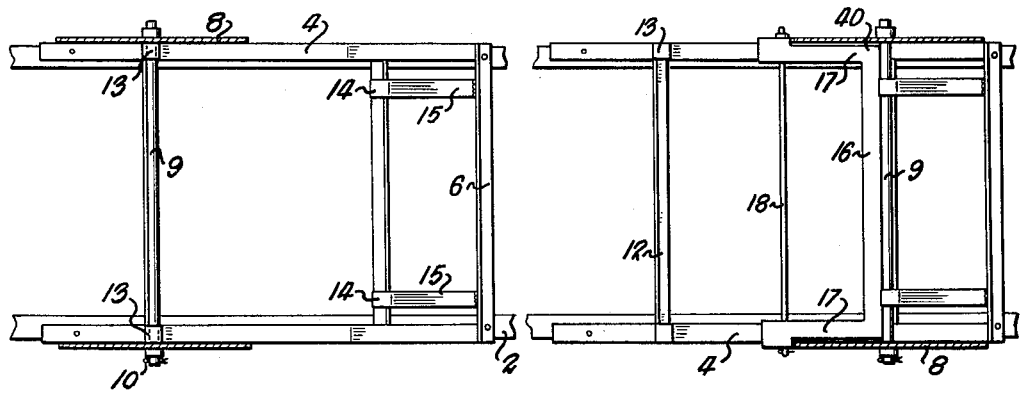
FIG. 4 is a plan view of the assembly illustrated in FIG. 3, a portion of the plate being shown at the forward end of the track.
FIG. 5 is a similar view to FIG. 4, a portion of the plate being shown at the rearward end of the track.
Figure 6:
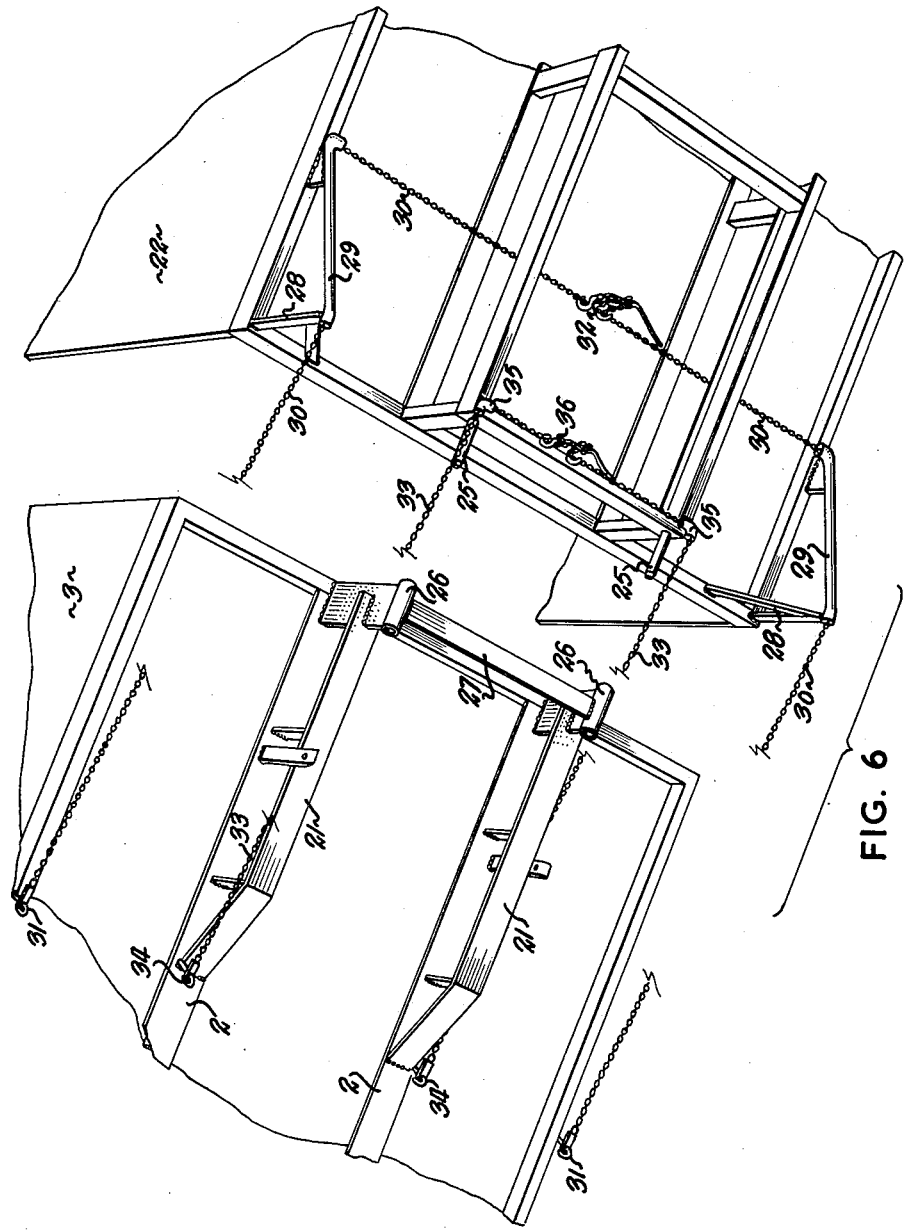
FIG. 6 is an inverted perspective view showing the bottom adjoining portions of the truck body and extension body.

The truck and its chassis 2 are of standard commercial structure, and in carrying out my invention the truck body 3 is removed from the chassis and the elements shown in FIGS. 3, 4 and 5 mounted upon the side members of the chassis.

The elements and their arrangement comprise a pair of rails 4 constituting a track extending lengthwise of the chassis and mounted upon the side members of the chassis to be positioned beneath the forward end of the truck body. The forward ends of the rails are permanently attached to the side members of the chassis, the rearwardly extending portions of the rails having a slight upward inclination and resting upon hardwood spacer blocks 5 interposed between the bottoms of the rails and the top faces of the chassis members. A cross brace 6 extends between the rear ends of the rails and is permanently secured to the chassis members.

The purpose of the rails is to so support a plate 7 that it may be moved along the track provided by the rails. The plate is formed with a pair of side flanges 8 which extend downwardly alongside the outer faces of the rails 4, the plate being supported upon the rails by a transverse bar 9 extending through aligned orifices in the flanges 8 and resting upon the upper faces of the rails 4, the bar being retained within the flanges by any suitable locking arrangement such as the washer and cotter pin assemblies 10. By this arrangement the plate and its supporting bar slidable or rollable upon the rails 4 may be moved from the forward lower position shown in FIG. 1 to the slightly elevated rearward position shown in FIG. 2.

To limit the movement of the plate and bar along the rails a cross brace 12 extends between the forward portions of the rails and is formed with a pair of jaws 13 at its ends which receive the bar 9 and limit its forward movement. A similar pair of jaws 14 is carried upon the upper rear ends of the rails to receive the bar and limit its rearward movement, as shown in FIGS. 3 and 5. As the jaws 14 take the strain of the entire trailing load, as shown in FIG. 2, they are strengthened by braces 15 extending to the cross brace 6. For retention of the bar 9 in its rear posiiton within the jaws 14 a removable U-shaped locking member 40 is provided and wherein its cross bar 16 is held against the side of the bar 9 by a pair of legs 17 having their free ends anchored to the rails by a removable transverse rod 18 extending through suitably positioned and aligned orifices in the legs and rails.

Before replacement of the truck body upon the chassis its forward under portion is fitted with a fifth wheel 19 adapted to rest upon the plate 7 and be turnable about a pin 20 extending through the wheel and plate in the usual manner. As the bar 9 is freely contained within the orifices in the plate flanges 8 the plate is free to rock longitudinally of the chassis as in standard practice.

As the provision of the rails and plate assembly raises the truck body slightly higher above the chassis than in standard arrangement resting directly upon the chassis, the rear end portion of the under face of the truck body carries a metal frame mounting pad 21 which rests upon the rear end of the chassis when the truck body is in the forward position to give the rear end of the body the same elevation as its front end.

The extension body 22 is carried upon a suitable chassis 23 mounted upon two pairs of road wheels 24, the forward end of the chassis being provided with a pair of forwardly projecting male coupling pins 25 receivable within a pair of female coupling sleeves 26 carried upon the rear cross bar 27 of the truck body mounting pad 21. For the purpose of retaining the pins 25 in coupling engagement within the sleeves 26 and to strengthen the abutting ends of the truck body and extension body against sag, a pair of rigid brace members 28 are provided to extend downwardly from the forward lower side edges of the extension body, the inclined struts 29 of the members being tubular and containing tensioning chains 30. In completing the coupling of the extension body to the truck body, the free ends of the chains 30 are attached to hooks 31 upon the bottom edges of the truck body intermediately of its length and the other ends of the chains underneath the extension body drawn together by chain tighteners 32 and thus sufficiently tighten the chains to draw the two bodies tightly together as shown in FIG. 2. A second pair of chains 33 is provided to extend from hooks 34 upon the chassis, the chains extending through tubular elbows 35 upon the forward end of the extension body chassis to be drawn taut by chain tighteners 36.

As the truck body in its forward position is somewhat lower than in its rearwardly moved position upon the truck chassis, and as the coupling pins 25 upon the extension body must mate with the coupling sleeves 26 upon the truck body when the extension body is being attached to the truck body to support the rear end of the truck body before it is moved rearwardly and upwardly, the forward end of the extension body is weighted to dip so that the coupling pins 25 and sleeves 26 are in alignment as shown in FIG. 1.

The truck 3 is used in the usual way for transporting loads within its capacity and when it is desired to carry bulkier loads the extension body is attached to the truck body by bringing the bodies together whereby the coupling pins 25 enter the coupling sleeves 26. Straps 37 normally anchoring the rear end of the truck body to the truck chassis by bolts are removed to free the rear end of the truck body from the rear end of the truck chassis and the coupling chains 30 and 33 hooked in place and initially tightened. The extension body and its chassis is restrained against forward movement and the truck slowly driven forwardly a distance of a couple of feet or so to slide the bar 9 of the plate 7 upon the rails 4 from the position shown in FIGS. 1 and 4 to the position shown in FIGS. 2, 3 and 5; it being understood that during this operation the legs 17 of the U-shaped locking member 40 are detached from the rails 4 and the member removed upon reaching the end of its rearward travel the bar 9 seats within the jaws 14 and the U-shaped locking member manually positioned in place whereby its bar 16 retains the bar 9 within the jaws.

As the plate 7 rides upwardly upon the inclined rails 4 the truck body is lifted to assume the position shown in FIG. 2 and at which time the chains 30 and 33 are further tightened to bring the bottoms of the bodies into alignment, the side panel bolts 38 being locked in place.

It will thus be seen that when the truck body and extension body are coupled together, as shown in FIG. 2, that they are combined to form a trailer unit supported at its front end by the fifth wheel 19 swingably resting upon the plate 7 and supported at its rear end by the extension body road wheels 24. The extension body may be readily detached by removing the locking member 40, restraining the extension body against rearward movement and slowly backing the truck several feet or so and whereby the truck body, plate 7 and bar 9 move forwardly, the body pad 21 coming to rest upon the truck chassis.

Although I have shown a particular embodiment of my invention it is to be understood that it may be altered in arrangement as deemed advantageous without departing from the spirit of conception of the invention, as set forth in the appended claims.

What I claim as my invention is:

1. In a light duty highway delivery truck in combination with an extension unit, wherein the truck comprises a chassis mounted upon front and rear pairs of road wheels and supporting a truck body permanently attached to the chassis by a pivotal connection comprising a plate slidably mounted upon the forward end portion of the chassis of the truck and a fifth wheel carried by the truck body and swingably mounted upon the plate, the plate, fifth wheel and truck body being slidably relatively of the chassis from a forward position upon the chassis wherein the truck body is completely supported by the chassis to a rearward position wherein the truck body projects rearwardly of the chassis and is solely connected to the chassis by the pivotal connection, and a truck body extension unit solely self supported upon spaced apart pairs of road wheels, the rear end of the truck body being attachable to the front end of the extension unit to be solely supported by the extension unit when the truck body is in its rearmost position relatively to the truck chassis.

2. The combination as defined in claim 1, wherein the fifth wheel mounting plate is moveable along a track extending rearwardly and upwardly of the truck chassis and whereby the truck body in movement rearwardly of the truck chassis is raised in an upward direction relatively to the chassis.

3. The combination as defined in claim 1, wherein the truck body, fifth wheel and plate in movement rearwardly of the truck chassis are raised in an upward direction relatively to the chassis, the rear end of the truck body and front end of the extension body carrying inter-engaging members coupling the extension body to the truck body, the extension body coupling member being in alignment with the truck body coupling member for reception of the truck body coupling member when the truck body is in the forward position.

4. The combination as defined in claim 1, wherein the truck body in movement rearwardly of the truck chassis is raised in an upward direction relatively to the chassis, the extension body carrying coupling members upon its front end for engagement with coupling members upon the rear end of the truck body, the front end of the extension body being tiltable downwardly before attachment to the truck body to bring its coupling members into alignment with the truck body coupling members for reception of said members when the truck body is in the forward lower position prior to movement of the truck body rearwardly of the truck chassis.

5. The combination as defined in claim 1, wherein the truck body in movement rearwardly of the truck chassis is raised in an upward direction relatively to the chassis, the extension body carrying male coupling members for insertion within female coupling members upon the rear end of the truck body, the front end of the extension body being tiltable downwardly before attachment to the truck body to bring its male coupling members into alignment with the truck body female coupling members for reception thereinto when the truck body is in the forward lower position prior to movement of the truck body rearwardly of the truck chassis.

6. The combination as defined in claim 1, wherein the truck body, fifth wheel and plate in movement rearwardly of the truck chassis are raised in an upward direction relatively to the chassis, the fifth wheel mounting plate being supported by a bar extending transversely of the truck chassis and about which the plate may rock, a pair of rails extending longitudinally of the truck chassis and upon which the bar is moveably mounted, the portions of the rails extending in the direction of the rear end of the chassis being upwardly inclined whereby movement of the bar from the front end portions of the rails to the rear end portions of the rails raises the fifth wheel mounting plate upwardly, a pair of stop members limiting movement of the bar in the direction forwardly of the chassis and in the direction rearwardly of the chassis, and removable means in combination with the stop members and applicable to the bar for retaining the bar against movement away from the stop members.

7. A highway truck and extension unit attached thereto and comprising a truck chassis, a plate slidable upon the truck chassis from a forward position to a rearward position intermediately of the length of the chassis, a truck body moveable lengthwise of the chassis from a forward position to a rearward position, a fifth wheel carried upon the front end portion of the truck body and mounted upon the plate and constituting the forward connection between the truck body and the truck chassis, an extension body mounted upon road wheels and attached to the truck body when in its rearwardly moved position and in which position the extension body solely supports the rear end of the truck body, the rear end of the truck body and the front end of the extension body carrying interengaging members coupling the extension body to the truck body, and manually adjustable tensioning means positioned below and extending between the truck body and the extension body for retaining the rear end of the truck body and forward end of the extension body against sag.

8. The combination as defined in claim 7, wherein the manually adjustable tensioning means positioned below and extending between the bodies comprises a pair of rigid brace members extending downwardly from the lower side edges of one body, and tightened chains extending upwardly from the lower portions of the brace members to the other body intermediately of the body's length.

9. The combination as defined in claim 7, wherein the manually adjustable tensioning means positioned below and extending between the bodies comprises a pair of rigid brace members extending downwardly from the lower side edges of one body, and tightened chains extending upwardly from the lower portions of the brace members to the other body intermediately of the body's length, the members coupling the extension body to the truck body being male coupling pins extending from the front end of the extension body above the adjustable tensioning means and receivable within female coupling sleeves carried by the truck body above the adjustable tensioning means.

References Cited in the file of this patent
UNITED STATES PATENTS

| | | |
|---|---|---|
| 2,151,640 | Menning | Mar. 21, 1939 |
| 2,317,508 | Zoder | Apr. 27, 1943 |
| 2,876,016 | McClellan | Mar. 3, 1959 |
| 3,004,772 | Bohlen et al. | Oct. 17, 1961 |